United States Patent [19]

Matsui et al.

[11] Patent Number: 4,586,579

[45] Date of Patent: May 6, 1986

[54] STRUCTURE FOR REMOVABLY MOUNTING SUPPORT ROD FOR HOOD FOR MOTOR VEHICLE

[75] Inventors: Tatsuhiko Matsui, Zama; Hiroyuki Aida, Hatano; Akira Watanabe, Mouka; Tsuneyoshi Oohazama, Yokosuka, all of Japan

[73] Assignees: Nissan Motor Company, Limited; Kato Hatsujo Kaisha, Limited, both of Yokohama, Japan

[21] Appl. No.: 512,016

[22] Filed: Jul. 8, 1983

[30] Foreign Application Priority Data

Aug. 9, 1982 [JP] Japan ................................ 57-138262

[51] Int. Cl.⁴ ................................ B62D 25/10

[52] U.S. Cl. ................................ 180/69.21

[58] Field of Search ................ 180/69.2, 69.21, 69.24; 292/351, 352; 114/203; 248/351, 352; 135/114

[56] References Cited

U.S. PATENT DOCUMENTS

| | | | |
|---|---|---|---|
| 2,549,133 | 4/1951 | Scott | 180/69.21 |
| 2,646,057 | 7/1953 | Blanchard | 135/114 X |
| 2,761,523 | 9/1956 | Lee | 180/69.2 |
| 3,225,856 | 12/1965 | Caramanna | 180/69 |
| 3,225,857 | 12/1965 | Haan et al. | 180/69.21 |
| 4,087,883 | 5/1978 | Amdal | 292/338 |

FOREIGN PATENT DOCUMENTS

| | | | |
|---|---|---|---|
| 1031026 | 11/1958 | Fed. Rep. of Germany . | |
| 7912153 | 9/1979 | Fed. Rep. of Germany . | |
| 2478176 | 9/1981 | France | 180/69 R |

*Primary Examiner*—John J. Love

*Assistant Examiner*—Mark C. Dukes

*Attorney, Agent, or Firm*—Schwartz, Jeffery, Schwaab, Mack, Blumenthal & Evans

[57] ABSTRACT

A device for supporting the engine hood of a motor vehicle in its open position by means of a support rod which is formed of an elastic resin material. The support rod is pivotal at one end thereof and adapted to be inserted at the other end thereof in a recess structure which is disposed in such a manner that the axis thereof makes a predetermined angle with the axis of the support rod when the latter is free and assumes the position to support the engine hood as mentioned above.

8 Claims, 5 Drawing Figures

STRUCTURE FOR REMOVABLY MOUNTING SUPPORT ROD FOR HOOD FOR MOTOR VEHICLE

BACKGROUND OF THE INVENTION

1. Field of the Invention

This invention relates to a support device for an openable closure member such as an engine hood of a motor vehicle.

2. Description of the Prior Art

As is well known in the art, an automotive engine hood is arranged to be opened for the purposes of inspecting the engine room, replenishing cooling water and/or engine oil, changing parts, making repairs, and so forth, and it is also arranged to be kept in its open position by means of an erectable support rod.

Conventionally, a metal rod has been widely employed as such a support rod, but it has the below-mentioned drawbacks.

The conventional support rod, since it is made of metal, is heavy and tends, when striking with the automotive body panel, to leave scars which are very likely to cause rust. Moreover, the metal rod has turned out to be expensive in that its manufacture involves surface treatment steps for anticorrosion.

Another disadvantage is such that the aforementioned conventional metal rod is heated up to a considerably high temperature by the engine heat. The metal rod is often too hot to be gripped by hand when one attempts to keep the engine hood open for inspecting the engine room immediately after the motor vehicle has been stopped.

SUMMARY OF THE INVENTION

Accordingly, it is an object of the present invention to provide a novel and improved support device of the aforementioned type which includes a support rod formed of a non-metallic resilient material, thereby elminating the above-described drawbacks of the prior art.

Other objects, features and advantages of the present invention will become apparent from the ensuing description taken in conjunction with the accompanying drawings.

DESCRIPTION OF THE PREFERRED EMBODIMENTS

Figure 1:
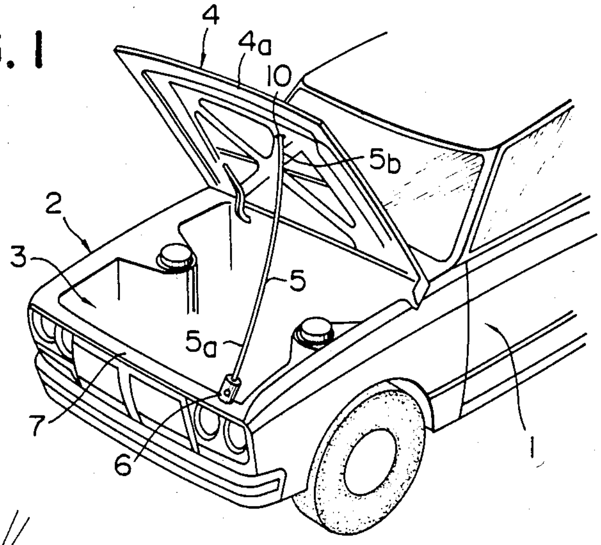
FIG. 1 is a perspective view showing the support device according to the present invention.

FIG. 1 sketchily shows a bonnet type motor vehicle, generally numbered 1. The vehicle comprises an engine room 2 having an upper opening 3, and a hood 4 which is hinged at the rear margin of the upper opening 3 of the engine room 2 in such a manner as to open and close the upper opening 3. Although the hood 4 is shown as being of open-in-front type in the illustrated example, it will readily be appreciated that the structure according to the present invention is equally applicable in the case where the hood 4 is of open-in-back type.

A support rod 5 is provided which is adapted to keep the hood in its open position as shown in FIG. 1. The support rod 5 is pivotally attached at tis base end portion *5a* so the fore margin 7 of the aforementioned upper opening 3 so as to be erectable. The support rod 5 is also arranged to be engaged at its free end portion *5b* with the hood with the aid of means which will be described below.

The hood 4 is provided with a recess structure 10 with which the support rod 5 is engaged at the free end portion *5a* thereof. In the example shown in FIG. 2, the recess structure 10 comprises a cap-like retainer member 12 which is attached to a reinforcement panel 11 provided on the bottom surface of the fore end portion *4a* of the hood 4. The retainer member 12 may consist of a molded article of rubber, plastic resin or the like.

Figure 3:
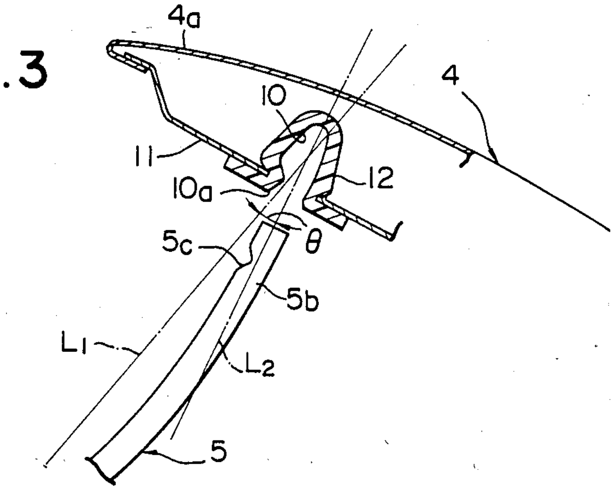
FIG. 3 is a cross-sectional view of the recess structure adapted for engagement with the free end portion of the support rod of the device according to another embodiment of the present invention.
Figure 4:
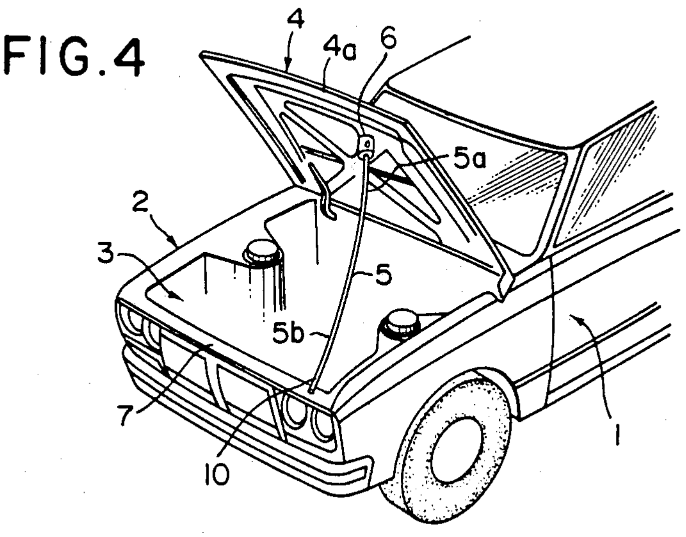
FIG. 4 shows an embodiment in which the support device is pivotally attached to the hood of the motor vehicle.
Figure 5:
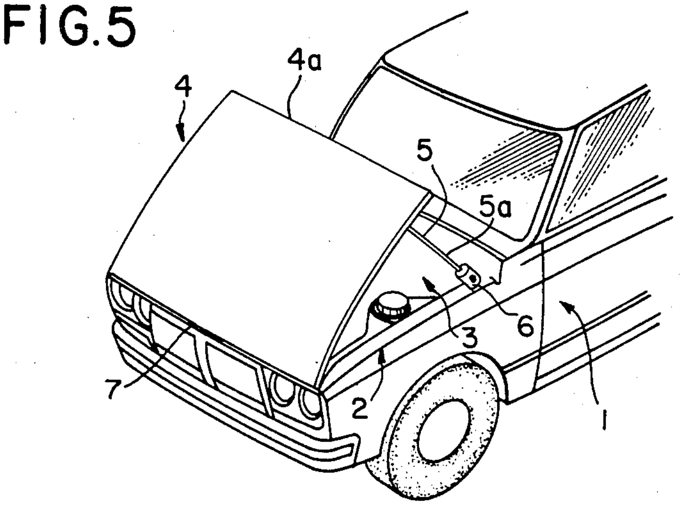
FIG. 5 shows the device used with an open-in-back type hood.

In the example shown in FIG. 3, too, the recess structure 10 is constituted by a cap-like retainer member 12 attached to the aforementioned reinforcement panel 11. In FIG. 3, it is to be noted that the recess structure 10 is provided at its entrance portion with a protuberance *10a* and that the support rod 5 is formed at its free end portion *5b* with a notch *5c*. The notch *5c* is adapted for engagement with the protuberance *10a* of the recess structure 10.

Figure 2:
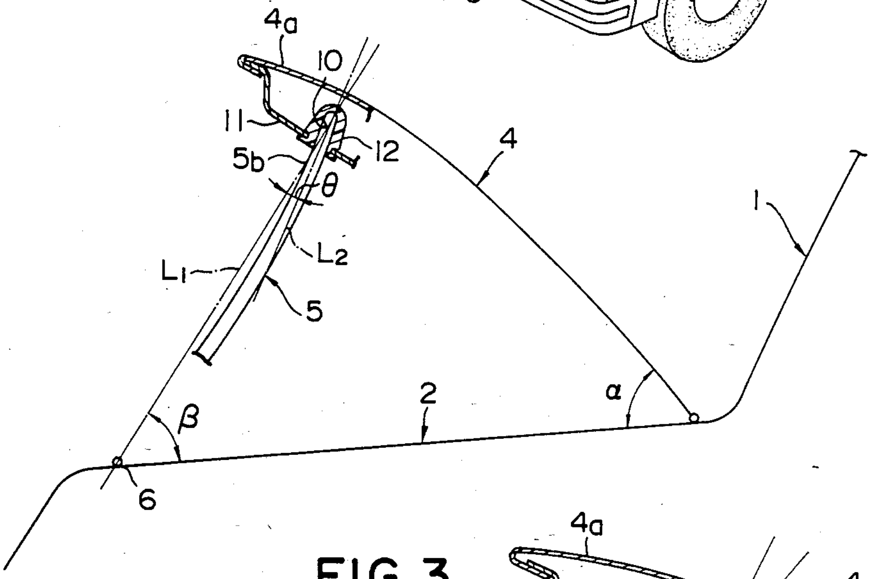
FIG. 2 is a cross-sectional view of the recess structure adapted for engagement with the free end portion of the support rod of the device according to an embodiment of the present invention.

As shown in FIG. 2, according to the present invention, assuming that the hood 4 is arranged to be opened through an angle $\alpha$ and that the support rod 5 is adapted, when it is in its straight state, to be erected with an angle $\beta$, the axis $L_1$ of the support rod 5, when the latter is free, makes a predetermined angle $\theta$ with the axis $L_2$ of the recess structure 10. In FIG. 3, too, the predetermined angle $\theta$ is made between the two axes.

In each of the foregoing embodiments of the present invention, the hood 4 is opened so that the upper opening 3 of the engine room is exposed; the support rod 5 is erected; and then the hood 4 is kept in its open position by means of the support rod 5. To achieve this, the support rod 5 is flexed to be aligned with the axis $L_2$ of the recess structure 10. Axis $L_2$ is substantially an axis of rotational symmetry of a recess defined by the structure 10. The recess need not be exactly symmetrical to define axis $L_2$. Subsequently, the free end portion *5b* of the support rod 5 is placed at the entrance portion of the recess structure 10. The hood 4 is then slightly moved downwardly so that the free end portion *5b* of the support rod 5 is forced into the recess 10.

With the foregoing arrangement, considerably great press-contact and frictional forces are caused to act between the free end portion *5b* and the recess 10 by virtue of the fact that the free end portion *5b* is restrained by the recess 10 as mentioned above. Thus, because of the tendency that the resiliency of the support rod 5 acts in such a direction as to return the rod from the flexed state to the original non-flexed or straight state, the engagement between the free end portion *5b* of the support rod 5 and the recess 10 is maintained unless the free end portion *5b* is intentionally disengaged from the recess 10 by a force exceeding the aforementioned press-contact and frictional forces. In this way, it is possible to prevent unintentional removal of the free end portion *5b* of the support rod 5 from the recess 10.

With the arrangement shown in FIG. 3, when the free end portion *5b* of the support rod 5 is forced into the recess 10 as mentioned above, the protuberance 10*a* is disposed in engagement with the notch 5*c*, and thus unintentional removal such as referred to above can more effectively be avoided.

As will readily be appreciated, it is also possible that the support rod may be pivotally attached to the hood and engaged with a recess provided at the margin of the upper opening of the engine room.

As mentioned above, according to the present invention, the support rod is formed of an elastic resin material which is much lighter in weight than metal. It is thus possible to realize weight reduction on a component basis.

Furthermore, the present support rod has improved durability in that it is free from corrosion which inevitably occurs with the conventional metal rod, and exhibits an excellent mechanical property with respect to bending or the like. Even when striking with the hood and/or body panel of the motor vehicle, the present support rod never leaves scars there.

Furthermore, even if it is subjected to engine heat, the present support rod, which is formed of an elastic resin material as mentioned above, does not become as hot as the conventional metal rod and thus no difficulties are encountered in handling.

Still further, the present support rod is conveniently manipulated since it is flexible and can readily be engaged with and disengaged from the recess structure simply by being flexed. More importantly, by virtue of the fact the predetermined angle $\theta$ is set between the axes of the support rod and recess structure as mentioned above in connection with FIGS. 2 and 3, it is possible to prevent unintentional or accidental removal of the free end portion of the support rod from the recess structure. Another advantage is that the free end portion of the support rod can be stably engaged with the recess structure and easily and disengaged therefrom, without being provided with any special configuration or construction. Thus, the use of the device is facilitated, and an increase in the number of components is avoided.

While the present invention has been illustrated and described with respect to specific embodiments thereof, it is to be understood that the present invention is by no means limited thereto but encompasses all changes and modifications which are possible within the scope of the appended claims.

What is claimed is:

1. A support device for supporting a closure member for closing an opening in the body of a motor vehicle, comprising:

a closure member pivotally attached to the body of the motor vehicle, wherein the closure member pivots between an open position in which the opening in the body is accessible, and a closed position in which the opening in the body is not accessible;

a support rod, having a base end and a free end, for supporting the closure member in the open position, wherein the support rod comprises an elastic resin material for creating an elastic restoring force when the rod is flexed to return the rod to the original non-flexed or straight state;

means for pivotally attaching the base end of said support rod to one of the closure member and the body of the motor vehicle;

a recess structure defining a recess having substantial rotational symmetry and having a symmetry axis, disposed on the other of the closure member and the body of the motor vehicle, and for engaging the free end of the support rod when said rod is supporting said closure member, wherein said recess structure is disposed with its symmetry axis oriented so that said support rod is only engaged when said free end is aligned with the symmetry axis and when said support rod is flexed; and wherein said elastic restoring force is created when the support rod is engaged by the recess structure and functions to force the free end of the support rod into the recess structure and create considerably great press-contact and frictional fit;

wherein said recess structure comprises an entrance portion, and a protuberance for engaging said support rod and disposed in said entrance portion; wherein said support rod comprises a notch for engaging said protuberance, and disposed substantially near said free end of said support rod; and wherein said protuberance engages said notch when the free end of the rod is aligned with the symmetry axis.

2. A support device according to claim 1, wherein said recess structure comprises a molded article of rubber, plastics or the like.

3. A support device according to claim 1, wherein said means for erectably attaching said support rod is provided on the body of the motor vehicle, and said recess structure is provided on said closure member.

4. A support device according to claim 1, wherein said means for pivotally attaching the base end of said support rod is provided on said closure member, and said recess structure is provided on the body of the motor vehicle.

5. A support device according to claim 1, wherein said closure member is an engine hood.

6. A support device according to claim 5, wherein said engine hood is of an open-in-front type.

7. A support device according to claim 5, wherein said engine hood is of an open-in-back type.

8. A support device according to claim 1, wherein said recess structure comprises a molded article of rubber, plastics or the like.

* * * * *